Figure 1:
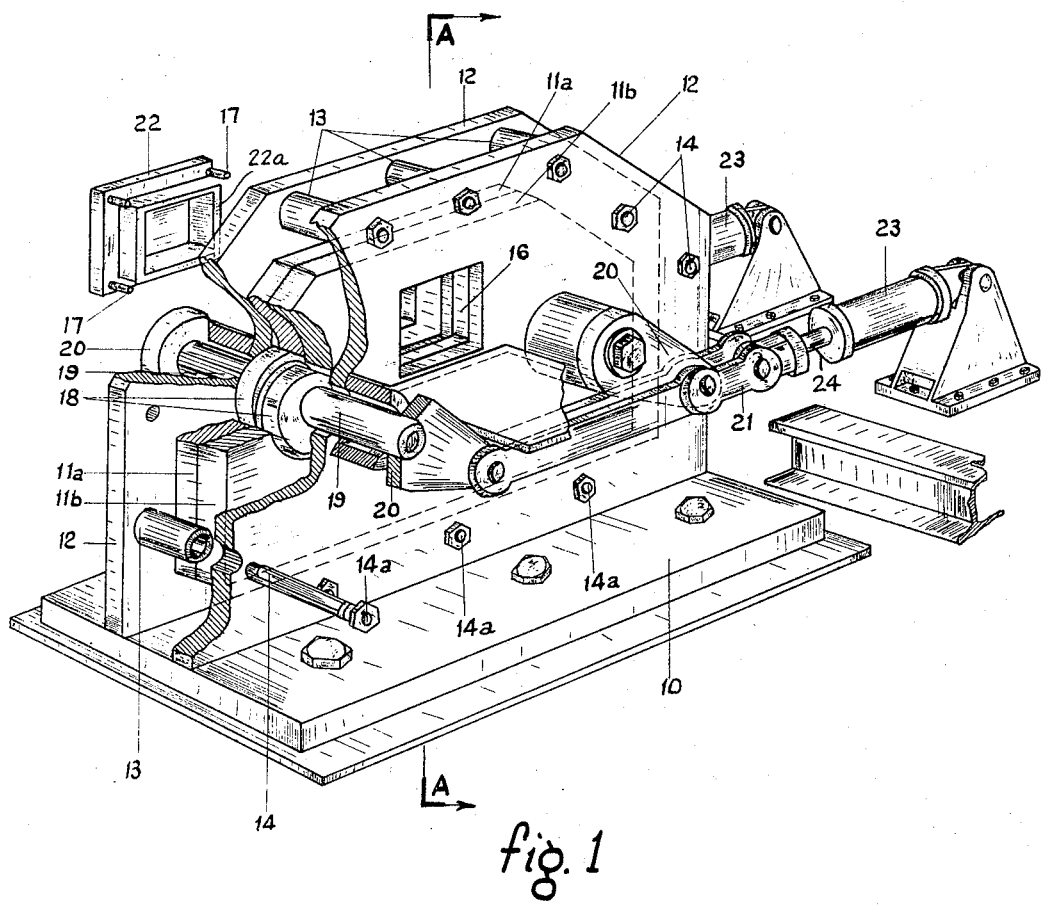

United States Patent
Breetvelt

[15] 3,664,221
[45] May 23, 1972

[54] SHEARING MACHINES

[72] Inventor: Emile Breetvelt, Johannesburg, Republic of South Africa

[73] Assignee: Intermenua (Proprietary) Limited, Johannesburg, Republic of South Africa

[22] Filed: May 5, 1970

[21] Appl. No.: 34,754

[30] Foreign Application Priority Data
May 7, 1969 South Africa...........................69/3272

[52] U.S. Cl..............................................................83/196
[51] Int. Cl. ...................................B23d 15/00, B23d 23/00
[58] Field of Search............................................83/196–200

[56] References Cited
UNITED STATES PATENTS

| 342,712 | 5/1886 | Stackpole | 83/196 |
| 2,638,985 | 5/1953 | Ross | 83/199 X |

FOREIGN PATENTS OR APPLICATIONS

| 603,473 | 8/1960 | Canada | 83/196 |

*Primary Examiner*—James M. Meister
*Attorney*—Stevens, Davis, Miller & Mosher

[57] ABSTRACT

A metal shearing machine in which two cooperating die carriers which, may optionally have dies made integral therewith, are mounted in a supporting stand therefor, the die carriers being associated with means for moving them in parallel planes simultaneously but in directions substantially at right angles to each other.

9 Claims, 2 Drawing Figures

PATENTED MAY 23 1972 3,664,221

SHEARING MACHINES

This invention relates to shearing machines of the kind in which metal sections, such as angle iron and I-beams, are threaded through aligned dies which are then moved out of alignment to impart a shearing force to the metal section.

In one known arrangement, the aligned dies are located in opposed positions on two die carriers which are mounted for relative pivotal movement. On such movement taking place, the dies are moved out of alignment with each other to cause a shearing force to be applied to a metal section threaded through the dies.

In another known arrangement, one die carrier is mounted stationarily to a stand while the other die carrier is caused to move along a linear path thereby bringing the dies out of alignment.

It has been found that distortion of the metal section occurs in the zone of the applied shearing force. Accordingly it is an object of the present invention to provide a shearing machine in which it is believed that distortion of the metal section in the shearing zone is at least minimized.

According to the present invention, a shearing machine includes a stand supporting two co-operating die carriers disposed substantially parallel to each other and displacement means operable on the die carriers and adapted to displace both the carriers along paths in parallel planes, the movement having a vector substantially at right angles to those planes. At the same time the carriers are restrained against rotation about an axis perpendicular to the planes.

Further according to the invention the displacement means includes cams which are adapted to displace the carriers along the paths. In a preferred form of the invention, two pairs of cams are provided, each pair of cams being adapted to operate on cam followers defined in the carriers. The cams may be coupled, for in phase operation, to an hydraulic ram.

It will be appreciated that the cams impart an arcuate movement to the die carriers. However, as such movement is over a small distance, the pairs of cams operating on the carriers may be adjusted to cause the carriers to move, at least initially, along paths disposed substantially at right angles to each other.

Also according to the invention each carrier is adapted to receive one die of a pair of dies, the dies being located in co-operating relationship to one another. The dies may be located in apertures defined in the carriers. Die advancing means may be provided for moving co-operating dies into firm contact.

In an alternate arrangement of the invention shearing edges are defined in the carrier. The need for separate dies is thereby dispensed with.

The stand may include guides between which the carriers are movably mounted.

Figure 2:
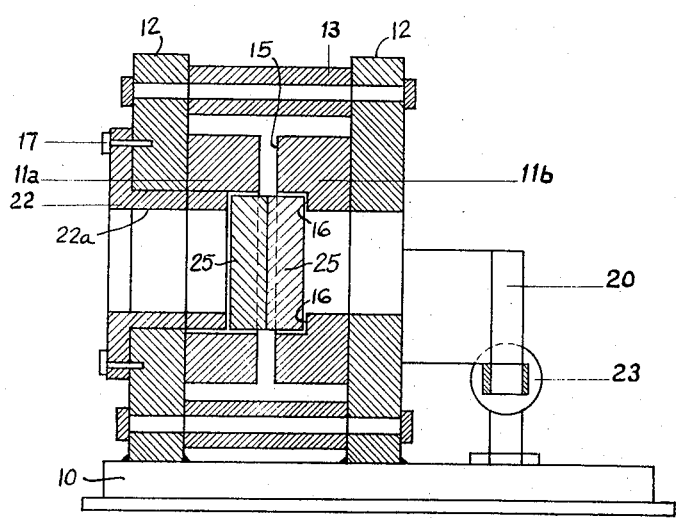

By way of example only preferred embodiments of the invention will now be described with reference to the accompanying drawings in which:

FIG. 1 is a perspective view of one form of the invention in which the dies are not shown, and FIG. 2 is a section on the line A—A in FIG. 1, with the dies shown in position.

The shearing machine includes a base plate 10 which may be mounted by means of bolts or the like fastening means to a foundation (not shown). Integral with the base plate 10 and extending vertically therefrom are two parallel plates 12. These plates are held in parallel spaced relationship by means of hollow sleeves 13 through which bolts 14 are passed. The bolts are drawn up tight by means of nuts 14a.

Die carriers 11a and 11b are movably sandwiched between the plates 12. These plates 12 act to restrict the die carriers to movement along paths contained in parallel planes. Each carrier 11a and 11b is provided with an aperture adapted to receive a die 25 (see FIG. 2). The dies 25 generally define an aperture having dimensions complementary to the cross-sectional dimensions of the metal section to be sheared. The metal section therefore fits snugly in the die. Various dies are provided to accommodate different types of metal sections.

The aperture formed in plate 11b includes an inwardly directed flange 16. The arrangement is therefore one in which the die 25 may be inserted into the aperture from the side of the inner face 15 of the plate 11b to rest firmly against the flange 16. The thickness of the die 25 is arranged so that when in position in the carrier, its shearing face is flush with the inner face of the carrier 11b or extends into the zone defined between the carriers. A further die 22 (also not shown) is provided which is adapted to be located in an aperture formed in plate 11a. In this latter case, the die is inserted in position from the carrier face not adjacent the other carrier.

Die advancing means 22 is provided through which pass threaded bolts 17. The threaded bolts 17 engage in tapped holes formed in the die carrier. The dimensions and shape of the advancing means 22 is such that a leading portion 22a of it can be inserted into the aperture formed in plate 11b. The arrangement therefore permits a die 25 to be inserted into the aperture of carrier 11a and then to be followed up by the leading portion 22a of die advancing means 22. On inserting the bolts through the die advancing means 22 and tightening them in the tapped holes, the die in carrier 11a is urged tightly against the die in the carrier 11b. It will be appreciated that use of the side plates 12 also prevent separation of the die carriers 11a and 11b during operation of the machine.

Apertures are also cut on the plates 12 to allow the dies to be located in position in the die carriers. Furthermore, the apertures in plates 12 permit metal sections to project to either side from the dies.

In the particular arrangement of the invention shown in the drawings, displacement of the die carriers is caused through pairs of cams 18 operating in cam followers defined in each of the die carriers. These cams are fast with shafts 19 which are journalled in bearings formed in plates 12. Fast with the shafts are arms 20 which in turn are coupled for relative pivotal movement to link members 21. The link members are in turn connected to a piston rod 24 forming part of hydraulic ram 23.

Each pair of cams is arranged to operate in phase while the cams operating on the one carrier are arranged to operate out of phase with the cams operating on the other carrier thereby to cause the carriers to move along paths disposed substantially at 90° to each other. Through the provision of two cams followers in each carrier, the carriers are restrained against rotation about axes perpendicular to the plates 12.

In operation the metal section to be sheared is threaded through the apertures defined in the dies. On displacement of the piston rod 24 taking place, the pairs of cams 18 are caused to move out of phase with each other. As a result of such movement, the die carriers 11a and 11b are moved out of alignment to impart a shearing action to a section threaded through the dies.

It will be appreciated that in the case of metal sections such as I-beams and angle iron, the movement of the dies along paths disposed at 90° to each other need be no more than the thickness of the webs and sides comprising the metal sections in order to bring about shearing of the section. By locating the metal section relative to the carriers so that movement of the cutting or shearing edges of the dies is substantially normal to faces of the metal section, it is believed that distortion is reduced.

Many forms of the invention exist. Thus instead of using cams, a pair of hydraulic rams can be arranged to operate directly on each of the carriers to bring about movement in the desired directions. In this case too, the rams drive the carriers along linear paths and the carriers are therefore restrained from rotation about axes perpendicular to plates 12. Furthermore, it may be advantageous under certain circumstances to provide cutting surfaces which are integral with the die carriers and which replace the need for separate dies. In another arrangement of the invention a plurality of apertures are defined in each of the carriers, so that a single shearing machine may be employed in shearing metal sections of different cross-sectional shape. In this latter case the carriers may be in the form of parallel beams and separation of the beams during operation of the machine may be prevented by interlocking formations that engage slidingly between the two beams. Doubtless many other forms of the invention exist, each differing in matters of detail only.

What I claim as new and desire to secure by Letters Patent is:

1. A shearing machine including a stand supporting two co-operating die carriers disposed substantially parallel to each other and displacement means operable on the carriers and adapted to displace each carrier along a path disposed substantially at right angles and contained in a plane parallel to the path of the other carrier, said carriers each being restrained against rotation about axes perpendicular to the parallel planes.

2. A shearing machine as claimed in claim 1, in which the displacement means includes cams operable on cam followers defined by the carriers.

3. A shearing machine as claimed in claim 1 in which the displacement means includes two pairs of cams, each pair of cams being adapted to operate on cam followers defined in the carriers.

4. A shearing machine as claimed in claim 1, in which the displacement means includes two pairs of cams, each pair of cams being adapted to operate on cam followers defined in a carrier and each pair of cams being coupled for in phase operation to a hydraulic ram.

5. A shearing machine as claimed in claim 1, in which each carrier is adapted to receive a die from at least one pair of dies, the dies of a pair being located in co-operating relationship to one another on the carriers.

6. A shearing machine as claimed in claim 1, in which the stand is defined by a base supporting two parallel plates between which the carriers are movably mounted.

7. A shearing machine as claimed in claim 5, in which the dies are adapted to be located in apertures provided in the carriers.

8. A shearing machine as claimed in claim 5, in which die advancing means is provided for moving co-operating dies into firm contact.

9. A shearing machine as claimed in claim 1, in which the carriers define co-operating shearing edges.

* * * * *